Jan. 20, 1970    T. D. STEINKE    3,490,896
PROCESS FOR IMPROVING MIXING EFFICIENCY
Filed Sept. 7, 1966    3 Sheets-Sheet 1

INVENTOR
THEODORE D. STEINKE
BY James E. Toomey
ATTORNEY

Jan. 20, 1970 T. D. STEINKE 3,490,896
PROCESS FOR IMPROVING MIXING EFFICIENCY
Filed Sept. 7, 1966 3 Sheets-Sheet 2

INVENTOR
THEODORE D. STEINKE
BY James E. Toomey
ATTORNEY

Jan. 20, 1970     T. D. STEINKE     3,490,896

PROCESS FOR IMPROVING MIXING EFFICIENCY

Filed Sept. 7, 1966     3 Sheets-Sheet 3

INVENTOR
THEODORE D. STEINKE

BY James E. Loomey

ATTORNEY

United States Patent Office 3,490,896
Patented Jan. 20, 1970

3,490,896
PROCESS FOR IMPROVING MIXING EFFICIENCY
Theodore D. Steinke, Spokane, Wash., assignor to Kaiser Aluminum & Chemical Corporation, Oakland, Calif., a corporation of Delaware
Filed Sept. 7, 1966, Ser. No. 577,762
Int. Cl. B01f 3/12, 5/12; C22b
U.S. Cl. 75—65
8 Claims

ABSTRACT OF THE DISCLOSURE

The instant disclosure relates to improving the mixing efficiency of a vessel by circulating the fluid therein with a flow actuating device and by maintaining a flow rate of fluid therein and positioning the discharge line of the flow actuating device so as to maintain a symmetrical bifurcated flow of fluid in the vessel.

---

This invention relates to improvements in the mixing of liquids. More specifically, this invention concerns a novel system for mixing liquids so as to melt or dissolve solid materials added thereto and provided a homogeneous liquid product. Although particularly concerned with mixing efficiency in the melting of metals, it is not limited thereto and it has applicability to the mixing of liquids and the dissolution or melting of solids therein in general.

All chemical processing involves the mixing or interpenetration of one substance with another. Thus, the mixing of liquids with solids, gases, and other liquids is of major importance. Many methods have been used to promote mixing, the most common of which is to move the fluid with a rotating impeller; the various forms of impellers are the marine-type, various radial flow turbines, and simple flat paddles. The use of flow actuating devices is also feasible and the instant invention is particularly concerned with a flow actuating device which circulates the fluid without having paddles or vanes of any kind disposed in the mass of the liquid mixture being stirred or mixed.

Although mixing is a commonplace operation, little concerted effort has been made until quite recently to understand its basic nature and how best to promote it for specific requirements. Historically the operation of mixing usually was of minor importance from a cost standpoint, either for equipment or for operation. Mixing is accomplished often in a container in which another operation is taking place and in the past these other operations usually were the most costly or critical ones. Attempts to measure mixing have for the most part been intimately connected with some particular process such as dissolving, oxidizing, or extracting; and the criterion selected has been one which was of particular value for that particular process. Thus, no common criteria for mixing have been evident. Furthermore, mixing will take place ultimately between various components by normal diffusion processes; hence, mixing is imposed only to hasten the desired interpenetration. Such forced interpenetration can be used also to control concentrations and concentration gradients, either of material or heat. Accordingly, as chemical processing has become more demanding of control both for batch and continuous systems, more attention has been given to the operation of mixing. Further, the translation of laboratory bench scale work to pilot plant to large scale production depends in large measure on reproducing the same environment with respect to mixing at the various stages.

The instant application is directed to a simple but accurate method of mixing, whatever the criteria for uniformity of the resultant mixture selected. The instant invention has particular application to the mixing of liquids with a flow actuating device which circulates the fluid within a vessel. This must be distinguished from the more conventional mixing devices which move the fluid with a rotating impeller immersed in the vessel. These devices may be considered as fluid agitating devices rather than flow actuating devices. The most common example of a flow actuating device which circulates the fluid within a vessel is a pump. Through the practice of this invention, one cannot only predict how long it would take to mix a given batch in a given vessel but select the conditions which will produce the shortest time for mixing the batch in the vessel through simple, well-known engineering calculations, then determine the total power required over the time necessary to mix the batch. The latter step involves basic engineering well known to all skilled in the art and shall not be dealt with further here.

According to the instant invention, the mixing efficiency of a vessel is improved by circulating the fluid therein with a flow actuating device and by maintaining a flow rate of fluid therein and positioning the discharge line of the flow actuating device so as to maintain a symmetrical bifurcated flow of fluid in the vessel. This description of the invention and advantages thereof will become more apparent from the following description taken in conjunction with the accompanying drawings.

Figure 1:
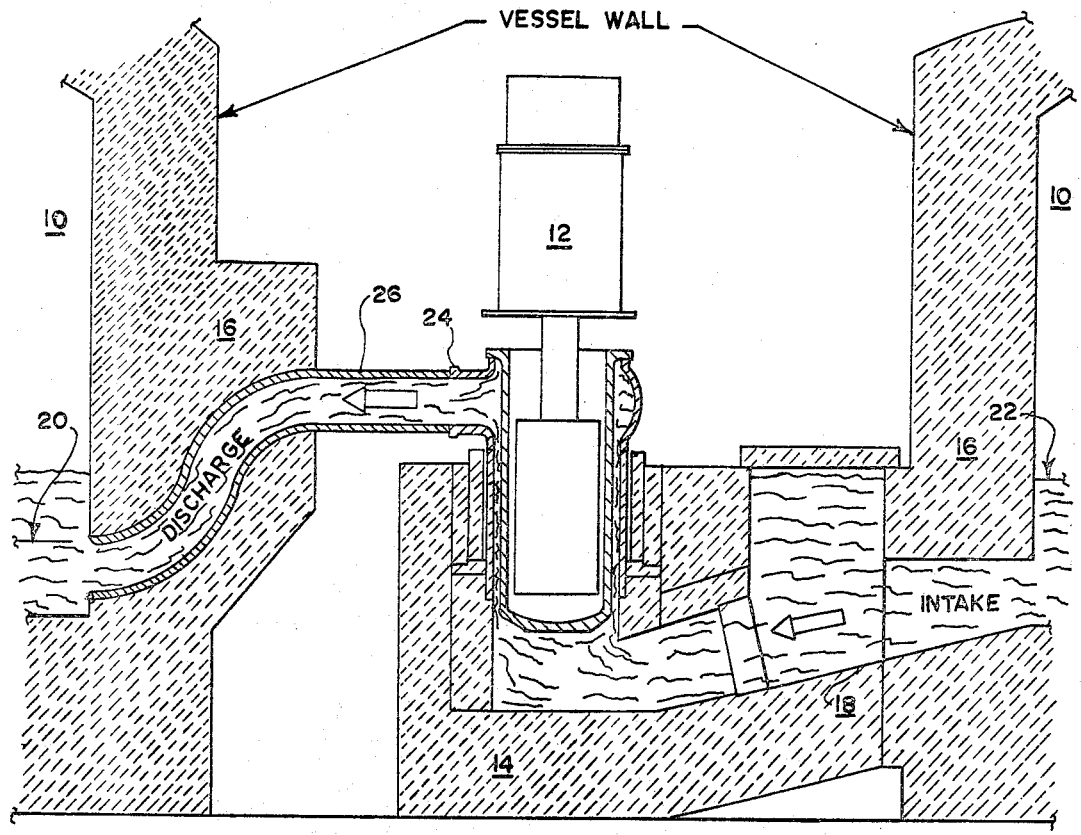
FIG. 1 is a diagrammatic and folded out illustration of a suitable flow actuating device according to the instant invention. Parts are removed for purposes of clarity and the view is in parabolic section as though the drawing was like two pages of a book folded out about the pump center line to show the details and arrangement of the device.
Figure 2:
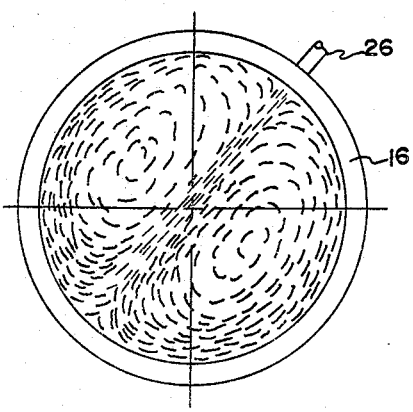
FIG. 2 illustrates the symmetrical bifurcated flow of fluid in the vessel which one achieves according to the practice of the instant invention to improve the mixing efficiency of the vessel.
Figure 3:
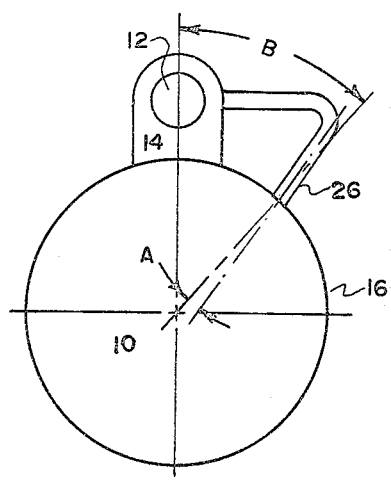
FIG. 3 is a simple diagrammatic representation of a mixing vessel with a flow actuating device mounted thereon to illustrate certain angular relationships which shall be discussed in more detail hereinafter.

With reference to these figures, particularly FIGS. 1, 2 and 3, a vessel 10 is provided with a flow actuating device shown here as a pump 12, installed just outside the vessel 10. In the case of a helical rotor or mechanical pump, this is accomplished as shown here by placing the pump 12 within a pump bay 14 that is attached to the shell 16 of vessel 10. A suction or supply port or channel 18 is provided from the interior of vessel 10 so that the molten material within the vessel 10 will flood the pump bay 14 to whatever liquid level is maintained in the vessel 10. The elevation of the intake port 18 of the pump 12 must be so located in the pump bay 14 that pump 12 will operate between the minimum melt level 20 and the maximum melt level 22 of the vessel 10. The discharge pipe connection 24 of pump 12 is then connected back to vessel 10 with suitable discharge piping 26 so that the liquid will be discharged back into vessel 10 below minimum melt level 20 in the vessel 10. This is particularly desirable when molten metal is being circulated in order to have the discharged molten metal stream below the surface of the melt at all times so as to prevent generation of excessive dross. Under other circumstances this may not be absolutely necessary but it is certainly always desirable. Similarly, it is desirable that the discharge piping 26 be installed so that the discharge stream of liquid from pump 12 will flow into vessel 10 parallel to the plane of the floor of vessel 10. This will minimize the wasting of energy for production of surface turbulence. Surface turbulence is of little value for efficient mixing since turbulence and agitation of the mass of the liquid is desired rather than of simply the surface thereof.

In various experimental studies, two vessels were used corresponding in configuration to that shown in the figures. One was a full size mixing vessel and the other a scale model. The various dimensions of the two vessels are shown in Table I.

TABLE I

| Factor | Full-Size Vessel | Vessel Model |
| --- | --- | --- |
| Inside diameter | 20 feet | 24 inches. |
| Maximum liquid depth | 21 inches | 2.1 inches. |
| Minimum liquid depth (after normal run-around) | 12 inches | 1.2 inches. |
| Maximum capacity | 80,000 lb. of Al. | 4.12 gal. of water. |
| Minimum capacity (after normal run-around) | 48,000 lb. of Al. | 2.35 gal. of water. |
| Discharge pipe ID | 7 inches | 0.7 inch. |

It was early discovered in these mixing efficiency tests that a flow rate in weight units per minute to quantity in the same weight units of fluid in vessel 10 ratio of greater than 1:5 is necessary for efficient mixing.

Tests with both of these vessels showed that a symmetrical bifurcated flow which forms identical contrarotating flow patterns in the vessel produces the most complete mixing-stirring action that is so essential to speedily melt or dissolve solids within a fluid bath and to attain complete homogeneity therein in the shortest time. Studies conducted with these vessels and pump produced flows showed that:

(1) Tangentially discharged flows which created a circular movement of the bath or melt required 57 minutes to dissolve a given volume of solids in a base fluid. The time required to reach complete homogeneity or dispersion of an ink or dye in the base fluid with this flow was indefinitely long.

(2) Flows discharged directly into the center of the vessel in a manner to create a bifurcated flow that generated contra-rotating pools within an equal volume of the base fluid used in (1) required only 34 minutes to dissolve an equal volume of the same solids used in (1). Homogeneity or complete dispersion of a duplicate amount of the dye used in (1) occurred in 1 minute 19 seconds.

Theoretically, to create this symmetrical bifurcated flow pattern in a round furnace or vessel, the discharge stream should enter the vessel from the side and pass directly across the center of the vessel. However, when a flow actuating device or pump is used to produce this flow of the liquid within the vessel, only two discharge port locations in relation to the pump bay intake port can be used to discharge directly across the center of the vessel and create the desired flow pattern. For a clear description of these positions and referring now to FIG. 3, the horizontal discharge angle of the piping into the vessel with respect to a radius line from the discharge port to the center of the vessel is indicated as angle A. The location of the discharge port with respect to the pump bay inlet port is designated as peripheral angle B. The two discharge port locations for direct center discharge (angle A equal to 0°) are when peripheral angle B equals 0° or 180°. As can be seen, angle A equal to 0° and angle B equal to 0° would place the discharge piping in the same location as the pump bay inlet port and presents a rather difficult design problem, although not an unsolvable one. This is especially true when both ports should be at or very near floor level. The installation of the system with angle A equal to 0° and angle B equal to 180° is quite feasible in design. However, it is not always practical to install the long run of piping needed to connect the pump with a discharge port on the opposite side of the mixing vessel because of interference from ancillary vessel equipment. If the installation is made, for example, with angle A set at 0° and angle B at 90°, the flow of metal entering the pump bay inlet during pump operation will disturb the centrally discharged flow into the vessel sufficiently to prevent creation of the desired symmetrical bifurcated flow pattern. Longer melting and mixing times are a result of this condition. The model studies showed that this could be overcome so that the ideal flow pattern could again be created at any setting for angle B simply by varying angle A an amount off of 0° to compensate for the flow disturbance created by the pump bay inlet port. For melting and mixing most efficiently, this amount varies from 0° to 5° according to angle B.

Full scale tests were conducted using the full scale vessel having an 80,000 pound capacity to melt aluminum. The pump used was a 20,000 pound per minute capacity helical rotor electromagnetic pump. The installation was made with angle A set at 4° off center, away from the pump bay inlet port and angle B set at 24°. A perfectly symmetrical bifurcated flow was created forming two identical contra-rotating pools of metal. The mixing-stirring action substantially increased melt rates and improved the homogeneity of the metal after melt down.

These tests shall be discussed in greater detail below.

Figure 4:
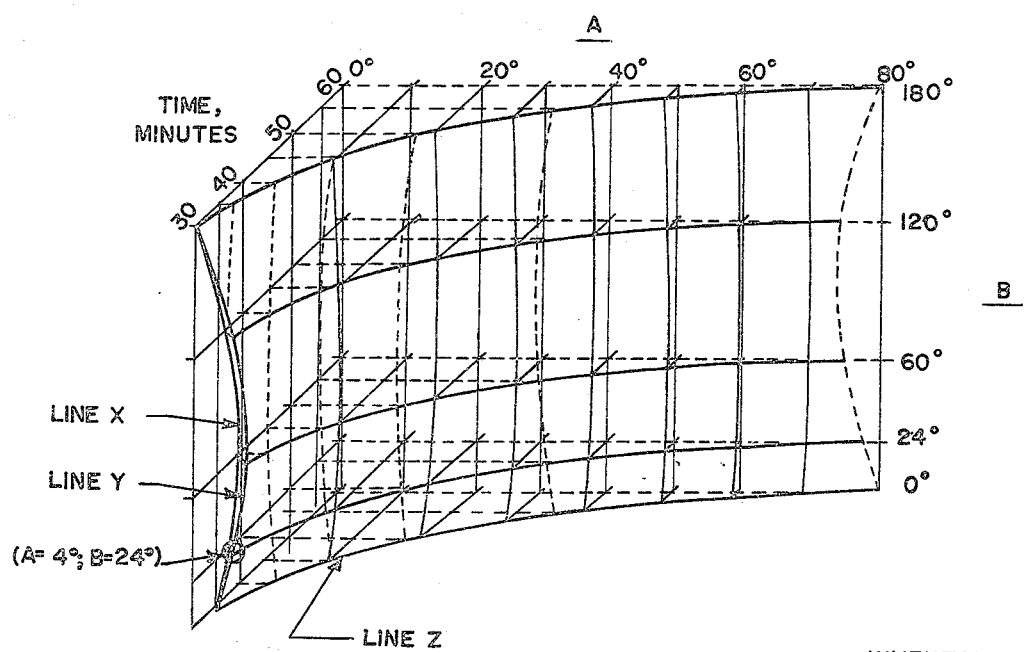
FIG. 4 is a three-dimensional graph showing the relationship between the various angles to be discussed more fully hereinafter and mixing time.

In the model vessel, blocks of ice equivalent in scale size to 1,000 pound ingots of aluminum, were formed to simulate a typical charge of solid metal that is normally placed in a melting furnace. Lead shot was dispersed in the ice while it was at the slushy stage during freezing to cause the ice to sink in water. Mixing vessel 10 was filled with water to minimum molten metal level after a furnace run around operation. An ice charge equal in scale volume to that of a normal full size furnace charge of metal (32,000 pounds) was placed in the furnace. The pump (an electric motor driven centrifugal pump) was started and the flow rate was set to an equivalent of 20,000 pounds per minute flow rate of molten aluminum. The melt down of the charge was timed and recorded while the flow patterns were observed. Additional charging-melting studies were conducted at various discharge and peripheral angular settings. A graphical summary of the results of the melt down trials that were conducted is shown in FIG. 4. This three-dimensional graph shows the relationship of angle A, angle B and melt down time. The horizontal planes may be visualized as a stack of two-dimensional graphs (angle A v. time) with angle B fixed at 0°, 24°, 60°, 120° and 180° respectively. The grid lines are eliminated in the foreground and their intersection with the resulting plane is shown for clarity.

The model studies show that stirring efficiency to produce the most rapid melt rate is primarily dependent upon the proper discharge angle, not the peripheral angle of a pump discharge system. As shown in FIG. 4, the effect of varying angle A while angle B is fixed results in a melting time differential of about 30 minutes (example, line Z). The effect of varying angle B while angle A is constant provided less dramatic results, causing a melting time differential of only 6 minutes (example, line X). The optimum value of angle A for minimum melt down time varies from 0°–5°, according to the value of angle B (example, line Y). The coordinates, A=4°, B=24°, is an example of design criteria that could be used on a full size vessel to provide the optimum in stirring efficiency for a short piping system.

Trials were conducted to determine the mixing characteristics of the different flow patterns that would be formed in the vessel by various discharge and peripheral angular settings of the discharge pipe. In the initial test, a peripheral angle of 20° was set (angle B). The discharge angle (angle A) was set at 70° to provide a discharge that was almost tangential to and just inside the vessel wall. The vessel was filled to maximum melt level and the centrifugal pump started. Again, flow was set equivalent to 20,000 pounds per minute of molten aluminum. One-fourth ounce of black ink was poured into the center of the vessel. The time was measured from the introduction of the ink into the water until complete dispersion, judged visually, had taken place. Additional trials were made at various discharge angular settings and repeated at several peripheral angles within the vessel. The results of these trials showed that varying the discharge angle into the vessel produced a dramatic difference in mixing efficiency, in comparison to the insignificant effect derived from varying the peripheral angle. The results of each trial are given in Table II.

TABLE II

| B/A | Time for Dispersion (min:sec) | | | | |
|---|---|---|---|---|---|
|  | 70° | 40° | 20° | 5° | 0° |
| 20° | Infinite | 55:00 | 5:30 | 1:33 | 1:40 |
| 40° | do | 57:00 | 5:44 | 1:32 | 1:47 |
| 60° | do | 60:00 | 6:03 | 1:37 | 2:04 |
| 80° | do | 65:00 | 6:38 | 1:38 | 1:57 |
| 100° | do | 67:00 | 6:41 | 1:40 | 2:01 |
| 120° | do | 63:00 | 6:08 | 1:35 | 1:52 |
| 140° | do | 59:00 | 5:39 | 1:29 | 1:39 |
| 160° | do | 57:00 | 5:35 | 1:30 | 1:37 |
| 180° | do | 54:00 | 5:27 | 1:23 | 1:19 |

Figure 6:
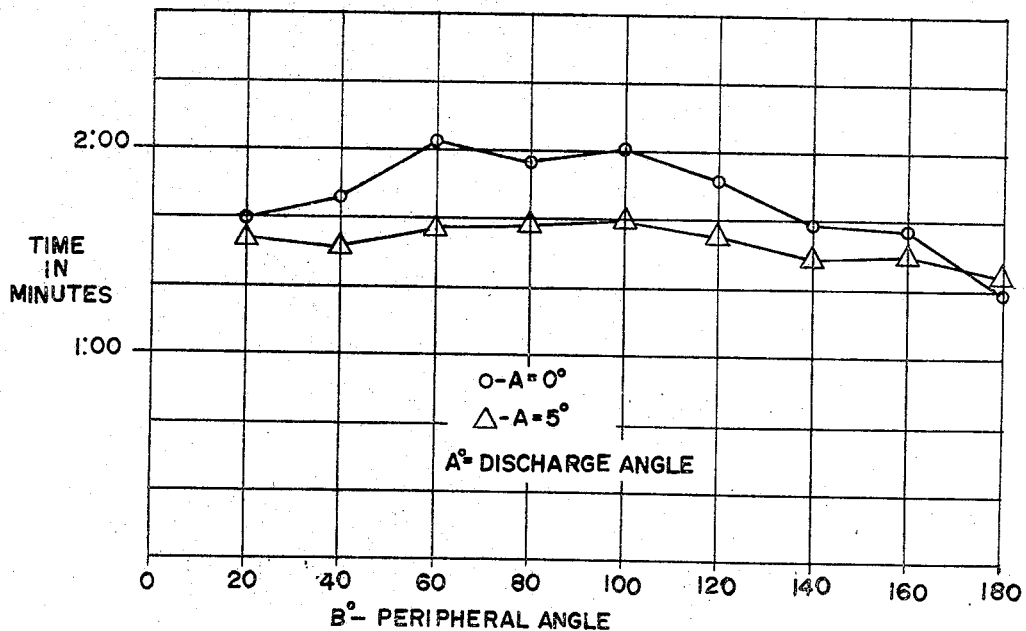
FIG. 6 is a graph showing certain mixing data to be discussed in detail hereinafter.

The ink or dye dispersion tests showed that a 5° angle of discharge produced more rapid dispersion of the ink than 0° except when angle B was 180° or 0°. As shown in FIG. 6, this was evident through almost all ranges of possible peripheral angles on the vessel. The studies revealed that complete dispersion at the 0° discharge angle is slightly slower than at a 5° angle because the intake of fluid at the pump suction port disturbs the symmetrical bifurcated flow created at the 0° discharge angle. Flow disturbance from the pump intake is least when the peripheral angle and discharge angle are set at 180° and 0° respectively. The symmetrical bifurcated flow created with this setting (A=0°, B=180°) produced the fastest rate of dispersion. However, to utilize this position requires an extremely long piping system. The example of design criteria for a short piping section (A=4°, B=24°), shown in the stirring-melting results would again be an optimum arrangement for an efficient mixing operation to produce homogeneity with A=5° and B=40° also being an excellent arrangement although a slightly longer piping system would be required.

Figure 5:
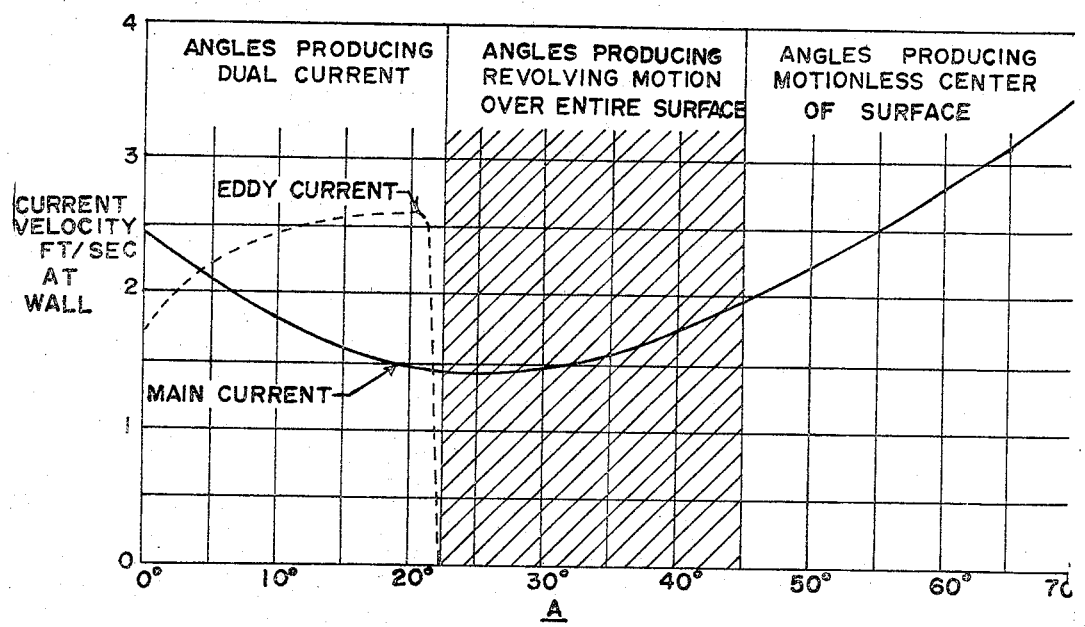
FIG. 5 is a graph showing how the flow pattern will vary as a certain angular relationship varies which will be explained in detail hereinafter.

Circulation conditions were studied as they were created by various settings of discharge angle A at a fixed peripheral angle B of 20°. The model vessel was filled to the maximum melt level. The pump was started and adjusted to a scale flow of 20,000 pounds per minute of molten aluminum. Thin, washer-like slices of polyethylene tubing were dropped on the melt and were carried by the current. Visual observations of circulation patterns and the time required for a particle to complete a revolution of the vessel were recorded during each trial to compare current velocities and types of current produced. FIG. 5 shows the result of these studies. As shown in FIG. 5 a dual current was produced at discharge angle settings (angle A) from 0°–22½° with a symmetrical bifurcated flow being created at approximately 4°. From 22½°–45° a revolving motion over the entire surface of the melt was created, and from 45°–70° a motionless center of the surface was created.

These test results show that through the practice of the instant invention, the mixing efficiency of a vessel can be dramatically improved. The unexpectedly superior results in mixing and in the melting operation, which is really a mixing operation involving heat transfer, due to very small adjustments in the angular position of the flow actuating device discharge line to produce a symmetrical bifurcated flow, all unexpected certainly illustrated the many unobvious and unexpected advantages from the practice of the instant invention.

While there has been shown and described hereinabove the presently preferred practices of the process of this invention, it is to be understood that the invention is not limited thereto and that various changes, alterations, and modifications can be made without departing from the spirit and scope thereof as defined in the appended claims. For example, the process has been described with respect to the melting of ice in water or aluminum ingot in molten aluminum. Obviously it is applicable to the melting or dissolution of many solids in many liquids and the mixing of many liquids to produce a homogeneous mixture.

What is claimed is:

1. In the method of improving the mixing efficiency of a vessel of substantially circular cross-section and substantially uninterrupted by baffles by circulating liquid therein with a flow actuating device having a suction line and a discharge line, the improvement comprising positioning the discharge line of the flow actuating device so as to discharge the liquid at the circular periphery of said vessel and to minimize surface turbulence in said vessel and positioning the angle of discharge of the discharge line into the vessel at from about 0° to about 5° toward the periphery from a radius line of the vessel so as to maintain a symmetrical, bifurcated, liquid flow pattern in a horizontal plane of the vessel.

2. The method of claim 1 wherein the angular offset of the discharge line from the suction line measured from the center of the vessel is about 24° and the angle discharge of the discharge line into the vessel is about 4° toward the circumference from a radius line in the vessel.

3. The method of claim 1 wherein the angular offset of the discharge line from the suction line measured from the center of the vessel is about 40° and the angle of discharge of the discharge line into the vessel is about 5° toward the circumference from a radius line in the vessel.

4. The method of claim 1 wherein the angular offset of the discharge line from the suction line measured from the center of the vessel is about 180° and the angle of discharge line into the vessel is about 0° toward the circumference from a radius line of the vessel.

5. The method of claim 1 werein the fluid is molten metal.

6. The method of claim 1 wherein the fluid is molten aluminum.

7. The method of claim 1 wherein the flow rate into the vessel in weight units per minute is at a ratio of greater than 1:5 to the quantity in the same weight units of fluid in the vessel.

8. In the method of mixing and melting aluminum in a vessel of substantially circular cross section and substantially uninterrupted by baffles by adding a solid aluminum charge to molten aluminum therein and circulating the molten aluminum with a flow actuating device the improvement which comprises:

(a) maintaining a symmetrical bifurcated liquid flow pattern in a horizontal plane by positioning the angle of the discharge line into the vessel from the circular periphery thereof at from about 0° to about 5° toward the periphery from a radius line of the vessel.

(b) maintaining a ratio of flow rate of molten metal into the vessel in weight units per minute to quantity of molten metal in the vessel in the same weight units greater than 1:5 whereby the solid aluminum charge is melted and uniformly dispersed throughout the mass of molten aluminum.

References Cited

UNITED STATES PATENTS

| | | | |
|---|---|---|---|
| 671,075 | 4/1901 | White. | |
| 1,157,092 | 10/1915 | Du Rell | 259—95 X |
| 1,342,947 | 6/1920 | Duncan | 259—95 X |
| 1,737,699 | 12/1929 | Bond | 259—95 X |
| 1,939,101 | 12/1933 | Bingham | 259—95 |
| 2,021,092 | 11/1935 | Teliet | 259—95 |
| 2,342,225 | 2/1944 | Schnyder | 259—95 X |
| 2,465,544 | 3/1949 | Marsh | 75—65 |
| 2,470,267 | 5/1949 | Rosmait | 259—95 |
| 3,278,295 | 10/1966 | Ostberg et al. | 75—61 |

L. DEWAYNE RUTLEDGE, Primary Examiner

G. K. WHITE, Assistant Examiner

U.S. Cl. X.R.

75—61, 93; 259—95